US009416741B2

(12) United States Patent
Goodall et al.

(10) Patent No.: US 9,416,741 B2
(45) Date of Patent: Aug. 16, 2016

(54) EXHAUST SYSTEM COMPONENT INPUT PRESSURE ESTIMATION SYSTEMS AND METHODS

(71) Applicant: GM Global Technology Operations LLC, Detroit, MI (US)

(72) Inventors: James A. Goodall, Hartland, MI (US); Maher El-Jaroudi, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 92 days.

(21) Appl. No.: 14/551,533

(22) Filed: Nov. 24, 2014

(65) Prior Publication Data
US 2016/0146135 A1 May 26, 2016

(51) Int. Cl.
F02D 41/00 (2006.01)
F02B 37/22 (2006.01)
F02M 25/07 (2006.01)

(52) U.S. Cl.
CPC ............ *F02D 41/0052* (2013.01); *F02B 37/22* (2013.01); *F02D 41/0072* (2013.01); *F02M 25/0754* (2013.01)

(58) Field of Classification Search
CPC ... F02B 37/22; F02D 41/008; F02D 41/0052; F02D 41/14; F02D 41/1444; F02D 41/1445; F02D 41/1446; F02D 41/1447; F02D 41/1448; F02D 41/145; F02D 2041/1423; F02D 2041/1433
USPC .......... 701/103–106, 109–110; 123/672, 673, 123/674, 676, 679, 703; 60/274, 285, 286; 73/114.69, 114.71, 114.72, 114.73
See application file for complete search history.

(56) References Cited

U.S. PATENT DOCUMENTS

| 4,594,668 A | 6/1986 | Fujawa et al. |
| 5,050,376 A | 9/1991 | Stiglic et al. |
| 5,067,973 A * | 11/1991 | Pattas ............ F01N 3/023 55/283 |
| 5,761,902 A | 6/1998 | Usami et al. |

(Continued)

FOREIGN PATENT DOCUMENTS

| DE | 19964013 A1 | 7/2001 |
| DE | 102004009646 A1 | 9/2004 |

(Continued)

OTHER PUBLICATIONS

Office Action dated Apr. 20, 2012, from the German Patent Office for German Patent Application No. 10 2009 051 475.9; 7 pages.

(Continued)

*Primary Examiner* — Hai Huynh

(57) ABSTRACT

An output pressure module that sets an output pressure of a first component of an exhaust system of the vehicle equal to one of: an input pressure of a second component that is immediately downstream of the first component in the exhaust system; and ambient air pressure. A pressure drop module determines a pressure drop between an input of the first component and an output of the first component based a temperature of exhaust input to the first component. An input pressure module determines an input pressure of the first component based on a sum of the output pressure of the first component and the pressure drop between the input and the output of the first component. An actuator control module selectively controls at least one engine actuator based on at least one of the input and output pressures of the first component.

20 Claims, 5 Drawing Sheets

(56) References Cited

U.S. PATENT DOCUMENTS

| | | |
|---|---|---|
| 5,931,140 A | 8/1999 | Maloney |
| 6,226,981 B1 | 5/2001 | Bruch et al. |
| 6,247,311 B1 | 6/2001 | Itoyama et al. |
| 6,360,541 B2 | 3/2002 | Waszkiewicz et al. |
| 6,393,342 B2 | 5/2002 | Bauer et al. |
| 6,957,527 B2 | 10/2005 | Ueda et al. |
| 7,848,872 B2 | 12/2010 | Ma et al. |
| 8,061,127 B2 * | 11/2011 | Guo ............... F01N 9/002 123/299 |
| 8,266,890 B2 * | 9/2012 | Singh ............. F01N 3/023 60/274 |
| 8,855,894 B2 | 10/2014 | Hamama et al. |
| 8,857,157 B2 | 10/2014 | Hamama et al. |
| 2001/0044677 A1 | 11/2001 | Bauer et al. |
| 2002/0108603 A1 | 8/2002 | Wienand et al. |
| 2003/0101974 A1 | 6/2003 | Wienand et al. |
| 2004/0230366 A1 | 11/2004 | Ueda et al. |
| 2005/0096833 A1 | 5/2005 | Nakazawa |
| 2005/0242760 A1 | 11/2005 | Fujita et al. |
| 2008/0082289 A1 | 4/2008 | Barrillon et al. |
| 2008/0216557 A1 | 9/2008 | Wang et al. |

FOREIGN PATENT DOCUMENTS

| | | |
|---|---|---|
| DE | 102004043365 A1 | 3/2006 |
| DE | 102006007417 A1 | 8/2007 |
| EP | 1698776 A1 | 9/2006 |
| GB | 2357859 A | 7/2001 |
| WO | WO-2007093501 A1 | 8/2007 |

OTHER PUBLICATIONS

Office Action dated Dec. 14, 2012 from the German Patent Office for German Patent Application No. 10 2011 110 745.6, 7 pages.

Wendland, D., Sorrell, P., and Kreucher, J., "Sources of Monolith Catalytic Converter Pressure Loss," SAE Technical Paper 912372, 1991, doi:10.4271/912372, 14 pages.

Zhang, X. and Romzek, M., "Computational Fluid Dynamics (CFD) Applications in Vehicle Exhaust System," SAE Technical Paper 2008-1-0612, 2008, doi:10.4271/2008-1-0612, 31 pages.

Cereda, S., Bossù, R., Gambarotto, M., and Pazé, C., "1-D Modeling and Room Temperature Experimental Measurements of the Exhaust System Backpressure: Limits and Advantages in the Prediction of Backpressure," SAE Technical Paper 2008-1-0676, 2008, doi:10.4271/2008-1-0676, 9 pages.

Ukrop, D., Shanks, M., and Carter, M., "Predicting Running Vehicle Exhaust Back Pressure in a Laboratory Using Air Flowing at Room Temperature and Spreadsheet Calculations," SAE Technical Paper 2009-1-1154, 2009, doi:10.4271/2009-1-1154, 9 pages.

* cited by examiner

EXHAUST SYSTEM COMPONENT INPUT PRESSURE ESTIMATION SYSTEMS AND METHODS

FIELD

The present disclosure relates to internal combustion engine systems and more particularly to exhaust systems.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An engine combusts a mixture of air and fuel to produce drive torque and propel a vehicle. Air is drawn into the engine through a throttle valve. Fuel provided by one or more fuel injectors mixes with the air to form the air/fuel mixture. The air/fuel mixture is combusted within one or more cylinders to produce drive torque. An engine control module (ECM) controls the torque output of the engine.

Exhaust gas resulting from combustion of the air/fuel mixture is expelled from the engine to an exhaust system. The ECM may adjust one or more engine parameters based on signals from various sensors that are located in the exhaust system. For example only, one or more temperature sensors and/or exhaust flow rate sensors may be located in the exhaust system. The ECM may adjust, for example, airflow into the engine, the amount of fuel injected, and/or spark timing based on the signals.

The sensors provide the ECM with measurements regarding conditions within the exhaust system and allow the ECM to adjust one or more engine parameters to create desired exhaust conditions. As the number of sensors implemented in the exhaust system increases, however, the cost of producing the vehicle also increases. The increased production cost may be attributable to, for example, the sensors themselves, associated wiring and hardware, and/or research and development. Additionally, a vehicle producer may produce a variety of different vehicles, and each of the different vehicles may have a different exhaust system. Calibrating and adjusting sensors implemented in each different vehicle and exhaust system may also increase vehicle production cost.

SUMMARY

In a feature, an output pressure module that sets an output pressure of a first component of an exhaust system of the vehicle equal to one of: an input pressure of a second component that is immediately downstream of the first component in the exhaust system; and ambient air pressure. A pressure drop module determines a pressure drop between an input of the first component and an output of the first component based a temperature of exhaust input to the first component. An input pressure module determines an input pressure of the first component based on a sum of the output pressure of the first component and the pressure drop between the input and the output of the first component. An actuator control module selectively controls at least one engine actuator based on at least one of the input and output pressures of the first component.

In further features: the output pressure module further sets an output pressure of a third component of the exhaust system that is immediately upstream of the first component in the exhaust system equal to the input pressure of the first component; the pressure drop module further determines a pressure drop between an input of the third component and an output of the third component based a temperature of exhaust input to the third component; and the input pressure module further determines an input pressure of the third component based on a sum of the output pressure of the third component and the pressure drop between the input and the output of the third component.

In further features: a viscosity module determines a viscosity of the exhaust input to the first component based on the temperature of the exhaust input to the first component; and a density module determines a density of the exhaust input to the first component based on the temperature of the exhaust input to the first component. The pressure drop module determines the pressure drop between the input and the output of the first component based on the viscosity and the density of the exhaust input to the first component.

In further features: an exhaust gas flowrate (EGF) determination module determines an EGF through the first component; and an EGF normalization module determines a normalized EGF through the first component based on the EGF and the viscosity of the exhaust input to the first component. The pressure drop module determines the pressure drop between the input and the output of the first component based on the normalized EGF.

In further features: a first normalization value module determines a first normalization value for the first component based on the viscosity of the exhaust input to the first component and the density of the exhaust input to the first component. The pressure drop module further determines a normalized pressure drop between the input and the output of the first component based on the normalized EGF through the first component and determines the pressure drop between the input and the output of the first component based on the normalized pressure drop and the first normalization value.

In further features, the pressure drop module determines the pressure drop between the input and the output of the first component based on the normalized pressure drop divided by the first normalization value.

In further features, the first normalization value module determines the first normalization value for the first component based on the viscosity of the exhaust input to the first component, a normalized viscosity of the exhaust input to the first component, the density of the exhaust input to the first component, and a normalized density of the exhaust input to the first component.

In further features, the density module determines the density of the exhaust input to the first component further based on a normalized input pressure for the first component and determines the normalized input pressure for the first component based on a normalized ambient air pressure, a previous value of the input pressure of the first component, an ambient air pressure, and the first normalization value.

In further features: a second normalization value module determines a second normalization value for the first component based on the viscosity of the exhaust input to the first component. The EGF normalization module determines the normalized EGF through the first component based on the EGF through the first component and the second normalization value.

In further features, the second normalization value module determines the second normalization value for the first component based on the viscosity of the exhaust input to the first component and a normalized viscosity of the exhaust input to the first component.

In a feature, a method includes setting an output pressure of a first component of an exhaust system of the vehicle equal to one of: an input pressure of a second component that is immediately downstream of the first component in the exhaust system; and ambient air pressure. The method further includes: determining a pressure drop between an input of the first component and an output of the first component based a temperature of exhaust input to the first component; determining an input pressure of the first component based on a sum of the output pressure of the first component and the pressure drop between the input and the output of the first component; and selectively controlling at least one engine actuator based on at least one of the input and output pressures of the first component.

In further features, the method further includes: setting an output pressure of a third component of the exhaust system that is immediately upstream of the first component in the exhaust system equal to the input pressure of the first component; determining a pressure drop between an input of the third component and an output of the third component based a temperature of exhaust input to the third component; and determining an input pressure of the third component based on a sum of the output pressure of the third component and the pressure drop between the input and the output of the third component.

In further features, the method further includes: determining a viscosity of the exhaust input to the first component based on the temperature of the exhaust input to the first component; determining a density of the exhaust input to the first component based on the temperature of the exhaust input to the first component; and determining the pressure drop between the input and the output of the first component based on the viscosity and the density of the exhaust input to the first component.

In further features, the method further includes: determining an exhaust gas flowrate (EGF) through the first component; determining a normalized EGF through the first component based on the EGF and the viscosity of the exhaust input to the first component; and determining the pressure drop between the input and the output of the first component based on the normalized EGF.

In further features, the method further includes: determining a first normalization value for the first component based on the viscosity of the exhaust input to the first component and the density of the exhaust input to the first component; determining a normalized pressure drop between the input and the output of the first component based on the normalized EGF through the first component; and determining the pressure drop between the input and the output of the first component based on the normalized pressure drop and the first normalization value.

In further features, the method further includes: determining the pressure drop between the input and the output of the first component based on the normalized pressure drop divided by the first normalization value.

In further features, the method further includes: determining the first normalization value for the first component based on the viscosity of the exhaust input to the first component, a normalized viscosity of the exhaust input to the first component, the density of the exhaust input to the first component, and a normalized density of the exhaust input to the first component.

In further features, the method further includes: determining the density of the exhaust input to the first component further based on a normalized input pressure for the first component; and determining the normalized input pressure for the first component based on a normalized ambient air pressure, a previous value of the input pressure of the first component, an ambient air pressure, and the first normalization value.

In further features, the method further includes: determining a second normalization value for the first component based on the viscosity of the exhaust input to the first component; and determining the normalized EGF through the first component based on the EGF through the first component and the second normalization value.

In further features, the method further includes: determining the second normalization value for the first component based on the viscosity of the exhaust input to the first component and a normalized viscosity of the exhaust input to the first component.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An exhaust system of a vehicle includes various components, such as pipes, one or more catalysts, and one or more mufflers. Some exhaust systems include one or more turbochargers and other types of components. Exhaust output by an engine flows through the components before the exhaust is expelled from the vehicle.

An exhaust system modeling module according to the present disclosure estimates input gas temperature, output gas temperature, mass temperature, input pressure, and output pressure for one or more of the exhaust system components through which the exhaust flows. The input and output gas temperatures of an exhaust system component correspond to temperatures of exhaust gas entering and exiting the component, respectively. The mass temperature of an exhaust system component corresponds to the temperature of the material that makes up the component.

The input and output pressures of an exhaust system component correspond to pressures at an input and an output of the exhaust system component, respectively. The exhaust system modeling module determines the input pressure of an exhaust system component based on an estimated pressure drop across the component and the output pressure of that component. The exhaust system modeling module estimates the pressure drop across the component based on a temperature of the exhaust input to the component. This may increase the accuracy of the estimated pressure drop and, therefore, increase the accuracy of the estimated input pressure.

Figure 1:
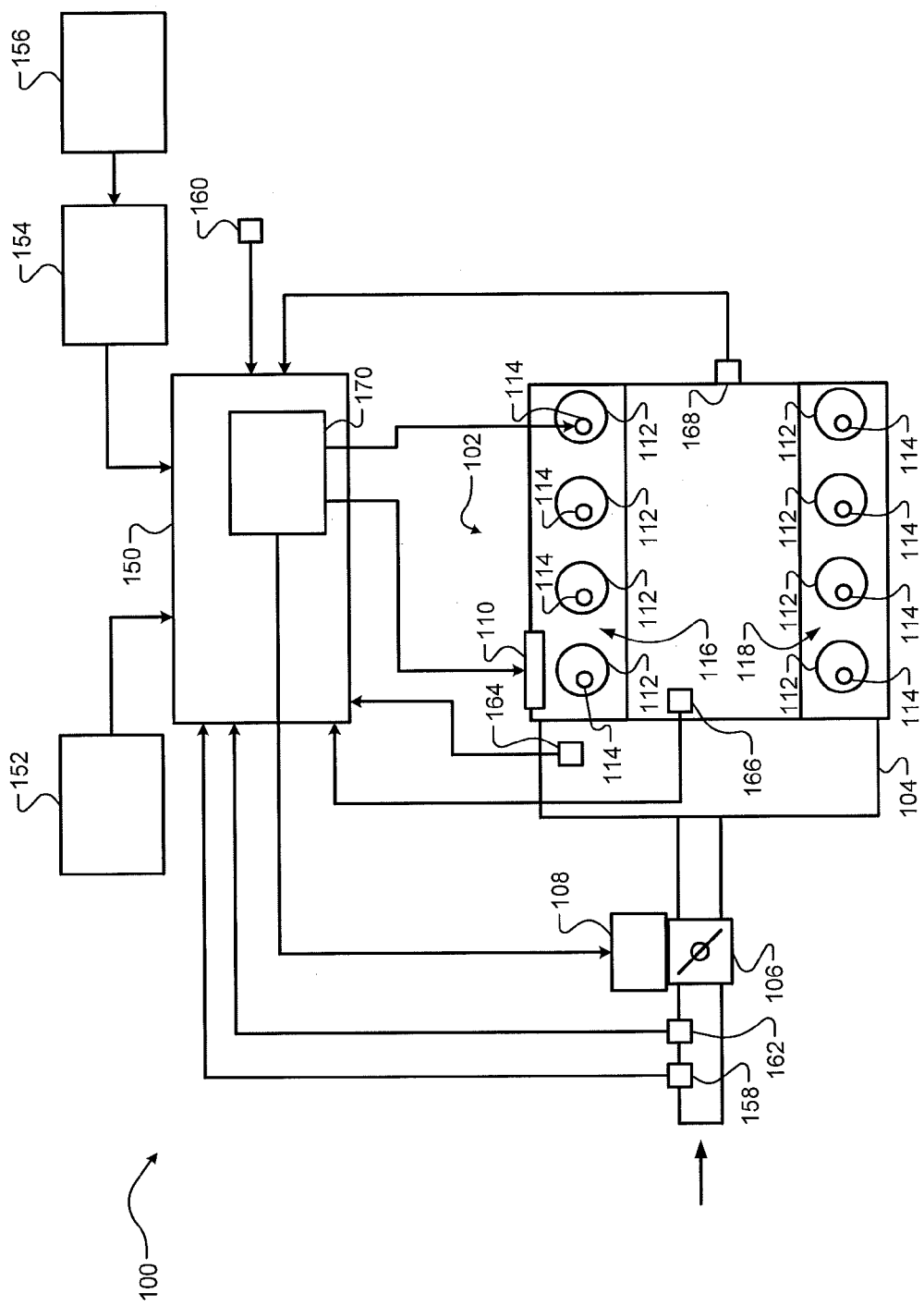
FIG. 1 is a functional block diagram of an example engine system according to the present disclosure.

Referring now to FIG. 1, a functional block diagram of an example engine system 100 is presented. An air/fuel mixture is combusted within an engine 102 to produce drive torque for a vehicle. The engine 102 may be a gasoline-type engine, a diesel-type engine, a hybrid-type engine, and/or another suitable type of engine. The engine 102 may be configured in any suitable cylinder configuration. For example only, the engine 102 may be configured in a V-type configuration, a flat-type configuration, or an inline-type configuration.

Air is drawn into the engine 102 through an intake manifold 104 and a throttle valve 106. The throttle valve 106 is actuated to control airflow into the engine 102. An electronic throttle controller (ETC) 108 controls the throttle valve 106 and, therefore, airflow into the engine 102.

A fuel system 110 injects fuel that mixes with the air to form the air/fuel mixture. The fuel system 110 may inject the fuel at any suitable location. For example only, the fuel system 110 may provide fuel into the intake manifold 104, into intake valves (not shown) associated with cylinders 112 of the engine 102, and/or directly into each of the cylinders 112. In various implementations, the fuel system 110 includes one fuel injector (not shown) for each of the cylinders 112.

The air/fuel mixture is combusted within the cylinders 112 of the engine 102. Combustion of the air/fuel mixture may be initiated by, for example, spark provided by spark plugs 114. In some engine systems, such as the engine system 100, one spark plug may be provided for each of the cylinders 112. In other engine systems, such as diesel-type engine systems, combustion may be accomplished without the spark plugs 114. Combustion of the air/fuel mixture generates drive torque and rotatably drives a crankshaft (not shown).

The engine 102 may include eight cylinders as shown in FIG. 1, although the engine 102 may include a greater or fewer number of cylinders. The cylinders 112 of the engine 102 are depicted as being arranged in two cylinder banks: a left cylinder bank 116 and a right cylinder bank 118. While the engine 102 is shown as including the left and right cylinder banks 116 and 118, the engine 102 may include one or more than two cylinder banks. For example only, inline-type engines may be considered to have cylinders arranged in one cylinder bank.

An engine control module (ECM) 150 controls the torque output of the engine 102. The ECM 150 may control the torque output of the engine 102 based on driver inputs provided by a driver input module 152. For example only, the driver inputs may include an accelerator pedal position, a brake pedal position, cruise control systems inputs, and other types of driver inputs.

The ECM 150 may also communicate with a hybrid control module 154 to coordinate operation of the engine 102 and one or more electric motors, such as electric motor (EM) 156. The EM 156 may also function as a generator, and may be used to selectively produce electrical energy for use by vehicle electrical systems and/or for storage in a battery.

The ECM 150 makes control decisions based on parameters measured by various sensors. For example, intake air temperature may be measured using an intake air temperature (IAT) sensor 158. Ambient air temperature may be measured using an ambient temperature sensor 160. Mass flow rate of air into the engine 102 may be measured using a mass airflow (MAF) sensor 162. Pressure within the intake manifold 104 may be measured using a manifold absolute pressure (MAP) sensor 164. In various implementations, engine vacuum may be measured, where engine vacuum is determined based on the difference between ambient air pressure and the pressure within the intake manifold 104.

Coolant temperature may be measured using a coolant temperature sensor 166. The coolant temperature sensor 166 may be located within the engine 102 or at other locations where the coolant is circulated, such as a radiator (not shown). Engine speed may be measured using an engine speed sensor 168. For example only, the engine speed may be measured based on the rotational speed of the crankshaft.

The ECM 150 may include an actuator control module 170 that controls engine operating parameters. For example only, the actuator control module 170 may adjust throttle opening, amount or timing of fuel injection, spark timing, cylinder deactivation, and/or turbocharger boost. The actuator control module 170 may also control other engine parameters, such as exhaust gas recirculation (EGR) valve opening, and/or opening/closing of intake and exhaust valves (not shown) associated with the cylinders 112 of the engine 102.

Figure 2:
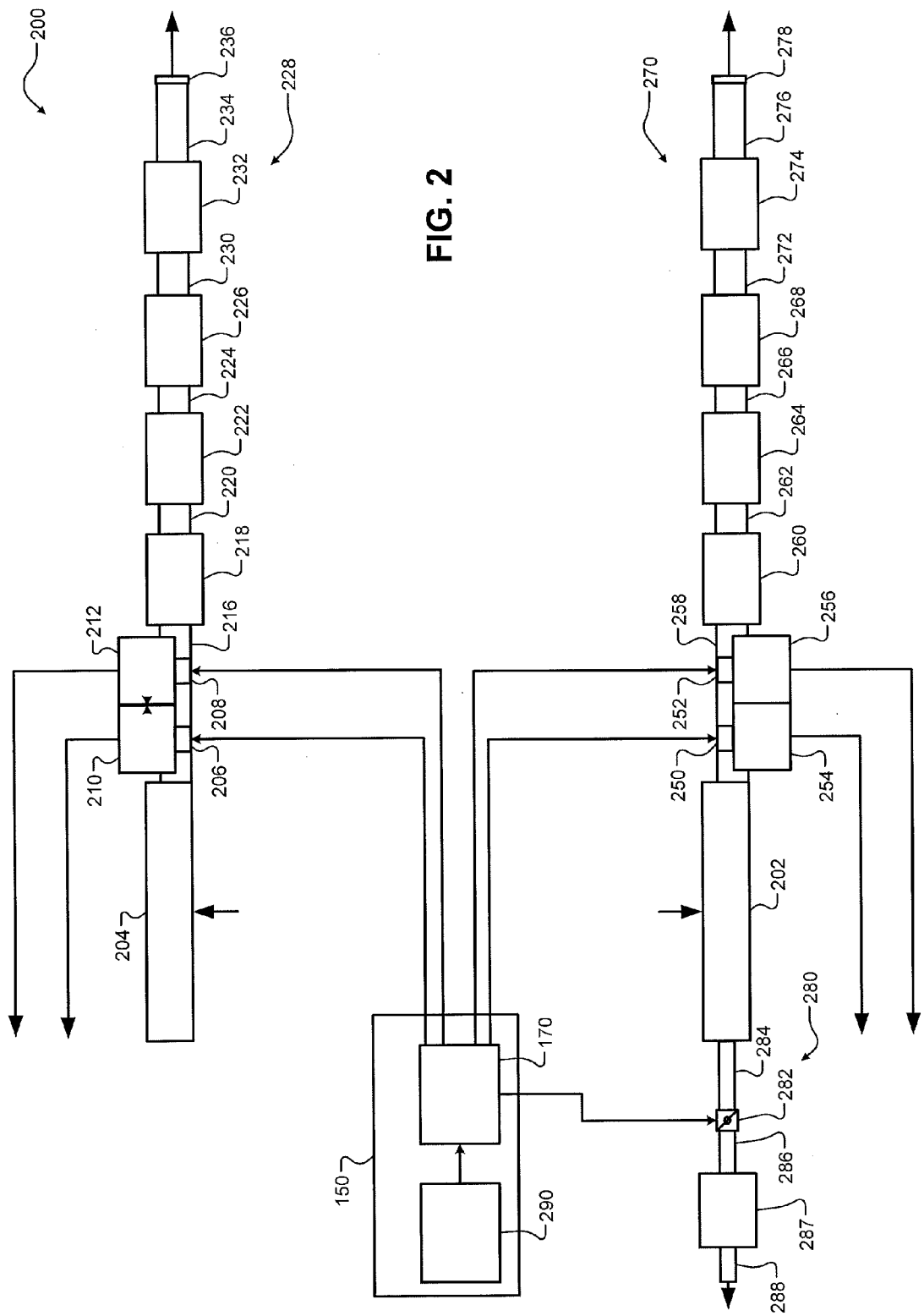
FIG. 2 is a functional block diagram of an example exhaust system according to the present disclosure.

Referring now to FIG. 2, a functional block diagram of an example exhaust system 200 is presented. The exhaust system 200 of FIG. 2 is a generic exhaust system including exhaust system components which may or may not be included in different models and types of vehicles manufactured by a vehicle manufacturer. The exhaust system 200 includes exhaust system components through which exhaust gas flows. While the exhaust system 200 will be described, the present disclosure is applicable to other exhaust system configurations, which may include a fewer or greater number components than the exhaust system 200. Numeric labels given to similar components of the exhaust system 200 are for distinction only, and are not representative of the relative importance of the components.

Exhaust gas resulting from combustion of the air/fuel mixture is expelled from the engine 102 to the exhaust system 200. More specifically, exhaust is expelled from the cylinders 112 of the right cylinder bank 118 to a right exhaust manifold 202. Exhaust is expelled from the cylinders 112 of the left cylinder bank 116 to a left exhaust manifold 204. With respect to the left exhaust manifold 204, the exhaust flows from the left exhaust manifold 204 past a first wastegate 206 and a second wastegate 208. The first and second wastegates 206 and 208 are associated with first and second turbochargers 210 and 212, respectively.

The turbochargers 210 and 212 each provide pressurized air to the intake manifold 104. The turbochargers 210 and 212 draw in air, pressurize the air, and provide the pressurized air to the intake manifold 104. The turbochargers 210 and 212 may draw in air from the intake manifold 104, ambient air, and/or another suitable source. One or more of the turbochargers 210 and 212 may be, for example only, variable geometry turbochargers.

One or more intercoolers (not shown) may also be implemented to dissipate heat from the pressurized air supplied to the intake manifold 104. The temperature of the pressurized air may be increased by, for example, the pressurization of the air and/or proximity to the exhaust system 200.

The turbochargers 210 and 212 are powered by the exhaust gas expelled from the cylinders 112 of the left cylinder bank 116. The wastegates 206 and 208 may allow the exhaust gas to bypass the turbochargers 210 and 212, respectively. In this manner, the wastegates 206 and 208 may be used to reduce the output (i.e., boost) of the turbochargers 210 and 212, respectively.

The ECM 150 controls the output of the turbochargers 210 and 212. For example only, the actuator control module 170 may modulate the output of the turbochargers 210 and 212 by controlling the positions of the wastegates 206 and 208, respectively. The actuator control module 170 may control the positions of the wastegates 206 and 208 by controlling the duty cycle (DC) of power applied to the wastegates 206 and 208.

The exhaust from the left cylinder bank 116 may flow from the wastegates 206 and 208, through a first exhaust pipe 216, to a first catalyst 218. Exhaust pipe surface between the left exhaust manifold 204 and the wastegates 206 and 208 and/or between the wastegates 206 and 208 may also be considered as part of the first exhaust pipe 216. The first catalyst 218 may include, for example, a diesel oxidation catalyst (DOC), a selective catalyst reductant (SCR) catalyst, a catalytic converter, and/or another suitable type of exhaust catalyst.

The exhaust from the left cylinder bank 116 may flow from the first catalyst 218, through a second exhaust pipe 220, to a second catalyst 222. The second catalyst 222 may include, for example, a DOC, an SCR catalyst, a catalytic converter, and/or another suitable type of exhaust catalyst.

The exhaust from the left cylinder bank 116 may flow from the second catalyst 222, through a third exhaust pipe 224, to a third catalyst 226. The third catalyst 226 may also include, for example, a DOC, an SCR catalyst, a catalytic converter, and/or another suitable type of exhaust catalyst. One or more of the catalysts may be implemented with another component, such as a diesel particulate filter (DPF).

In various implementations, more than one of the first, second, and third catalysts 218, 222, and 226 may be combined and implemented as a multi-stage catalyst. For example only, the first and second catalysts 218 and 222 may be implemented as a dual-stage catalyst. In other implementations, the second and third catalysts 222 and 226 may be implemented as a dual-stage catalyst, or the first, second, and third catalysts 218, 222, and 226 may all be implemented as a three-stage catalyst.

The exhaust from the left cylinder bank 116 may flow from the third catalyst 226 to a first muffler/tailpipe system 228. For example only, the first muffler/tailpipe system 228 may include a fourth exhaust pipe 230, a first muffler 232, a fifth exhaust pipe 234, and a first flapper valve 236. The exhaust may flow from the third catalyst 226, through the fourth exhaust pipe 230, to the first muffler 232.

The first muffler 232 dampens acoustic noise produced by the cylinders 112 of the left cylinder bank 116. The exhaust may flow from the first muffler 232, through the fifth exhaust pipe 234, to the first flapper valve 236. The first flapper valve 236 may increase pressure within the exhaust system 200, prevent external objects from entering the exhaust system 200, and/or perform any other function. The exhaust exits the exhaust system 200 past the first flapper valve 236.

The exhaust from the cylinders 112 of the right cylinder bank 118 may take a path similar to that of the exhaust from the cylinders 112 of the left cylinder bank 116, as described above. For example, the exhaust gas expelled from the cylinders 112 of the right cylinder bank 118 may flow from the right exhaust manifold 202 through a third wastegate 250 and a fourth wastegate 252.

The wastegates 250 and 252 are associated with third and fourth turbochargers 254 and 256, respectively. The wastegates 250 and 252 and the turbochargers 254 and 256 may be similar or identical to the wastegates 206 and 208 and the turbochargers 210 and 212, respectively. The ECM 150 (e.g., the actuator control module 170) may control the wastegates 250 and 252 and, therefore, control the boost of the turbochargers 254 and 256.

The exhaust from the right cylinder bank 118 may flow from the wastegates 250 and 252, through a sixth exhaust pipe 258, to a fourth catalyst 260. Exhaust pipe surface between the right exhaust manifold 202 and the wastegates 250 and 252 and/or between the wastegates 250 and 252 may also be considered as part of the sixth exhaust pipe 258. The fourth catalyst 260 may include, for example, a DOC, an SCR catalyst, a catalytic converter, and/or another suitable type of exhaust catalyst.

The exhaust from the right cylinder bank 118 may flow from the fourth catalyst 260, through a seventh exhaust pipe 262, to a fifth catalyst 264. The fifth catalyst 264 may include, for example, a DOC, an SCR catalyst, a catalytic converter, and/or another suitable type of exhaust catalyst The exhaust from the right cylinder bank 118 may flow from the fifth catalyst 264, through an eight exhaust pipe 266, to a sixth catalyst 268. The sixth catalyst 268 may include, for example, a DOC, an SCR catalyst, a catalytic converter, and/or another suitable type of exhaust catalyst. One or more of the catalysts may be implemented with another component, such as a diesel particulate filter (DPF).

In various implementations, more than one of the fourth, fifth, and sixth catalysts 260, 264, and 268 may be combined and implemented as a multi-stage catalyst. For example only, the fourth and fifth catalysts 260 and 264 may be implemented as a dual-stage catalyst. In other implementations, the fifth and sixth catalysts 264 and 268 may be implemented as a dual-stage catalyst, or the fourth, fifth, and sixth catalysts 260, 264, and 268 may all be implemented as a three-stage catalyst.

The exhaust from the right cylinder bank 118 may flow from the sixth catalyst 268 to a second muffler/tailpipe system 270. For example only, the second muffler/tailpipe system 270 may include a ninth exhaust pipe 272, a second muffler 274, a tenth exhaust pipe 276, and a second flapper valve 278. The exhaust may flow from the sixth catalyst 268, through the ninth exhaust pipe 272, to the second muffler 274.

The second muffler 274 dampens acoustic noise produced by the cylinders 112 of the right cylinder bank 118. The exhaust may flow from the second muffler 274, through the tenth exhaust pipe 276, to the second flapper valve 278. The second flapper valve 278 may increase pressure within the exhaust system 200, prevent external objects from entering the exhaust system 200, and/or perform other functions. The exhaust may exit the exhaust system 200 past the second flapper valve 278.

One or more exhaust gas recirculation (EGR) systems, such as EGR system 280 may also be implemented. For example only, the EGR system 280 may be associated with the right exhaust manifold 202, as shown in FIG. 2. While the EGR system 280 is shown as being connected to the right exhaust manifold 202, the EGR system 280 may be connected to the exhaust system 200 at another location, such as between the sixth catalyst 268 and the second muffler 274. The EGR system 280 or another EGR system may be implemented with the components receiving exhaust from the left cylinder bank 116.

The EGR system 280 includes an EGR valve 282, a first EGR pipe 284, a second EGR pipe 286, an EGR cooler 287, and a third EGR pipe 288. The EGR valve 282 is linked to the right exhaust manifold 202 via the first EGR pipe 284. The EGR valve 282 selectively redirects exhaust gas from the right exhaust manifold 202 back to the intake system via the second EGR pipe 286 and the third EGR pipe 288. The EGR cooler 287 may be implemented to cool exhaust gas being recirculated back to the intake system. The ECM 150 controls actuation of the EGR valve 282 and, therefore, exhaust gas flowrate (EGF) through the EGR system 280. For example, the actuator control module 170 may control the opening of the EGR valve 282.

The ECM 150 includes an exhaust system module 290 that is initially configured based on the exhaust system 200 of FIG. 2. While the exhaust system module 290 and the actuator control module 170 are shown and discussed as being located within the ECM 150, the exhaust system module 290 and/or the actuator control module 170 may be located in any suitable location, such as external to the ECM 150. The exhaust system module 290 receives data that indicates the configuration of an actual exhaust system implemented in the vehicle and re-configures according to the actual exhaust system. The actual exhaust system may include the same components as the exhaust system 200, or a lesser number of components than the exhaust system 200.

The exhaust system module 290 estimates (i.e., models) an input gas temperature, an output gas temperature, a mass temperature, and a pressure for each component of the actual exhaust system. The actuator control module 170 selectively adjusts one or more engine operating parameters based on the input gas temperature, output gas temperature, mass temperature, and/or pressure of one or more of the exhaust system components. In this manner, the actuator control module 170 may use the temperatures and/or pressure provided by the exhaust system module 290 to create desired exhaust system conditions.

The configuration module 302 may receive the actual configuration data 320 from any suitable source, such as memory or a device used to calibrate the vehicle.

The exhaust system modeling module 304 models (i.e., determines) one or more pressures and temperatures for each component of the actual exhaust system. More specifically, the exhaust system modeling module 304 models an input temperature, an output temperature, a mass temperature, an input pressure, and an output pressure for each exhaust system component through which exhaust gas flows. The input and output temperatures of a component correspond to the temperature of the exhaust gas input to and output from the component, respectively. The mass temperature corresponds to the temperature of the material(s) that makes up the component itself. The input and output pressures of a component correspond to pressures at an input and at an output of the component, respectively.

The exhaust system modeling module 304 stores the temperatures and pressures for each component of the exhaust system in the storage module 305. The storage module 305 may be implemented, for example, in memory. An example portion of a table of temperatures and pressures for a portion of the components of the exhaust system 200 that may be stored in the storage module 305 is provided below.

|  | Left Manifold | Turbo 1 | Turbo 2 | Pipe 1 | Cat 1 | Pipe 2 | Cat 2 | ... |
|---|---|---|---|---|---|---|---|---|
| Input Temp | TLM-IN | TT1-IN | TT2-IN | TP1-IN | TC1-IN | TP2-IN | TC2-IN |  |
| Mass Temp | TLM-M | TT1-M | TT2-M | TP1-M | TC1-M | TP2-M | TC2-M |  |
| Output Temp | TLM-OUT | TT1-OUT | TT2-OUT | TP1-OUT | TC1-OUT | TP2-OUT | TC2-OUT |  |
| Input Pressure | PLM-IN | PT1-IN | PT2-IN | PIN-P1 | PIN-C1 | PIN-P2 | PIN-C2 |  |
| Output Pressure | PLM-OUT | PT1-OUT | PT2-OUT | POUT-P1 | POUT-C1 | POUT-P2 | POUT-C2 |  |

Figure 3:
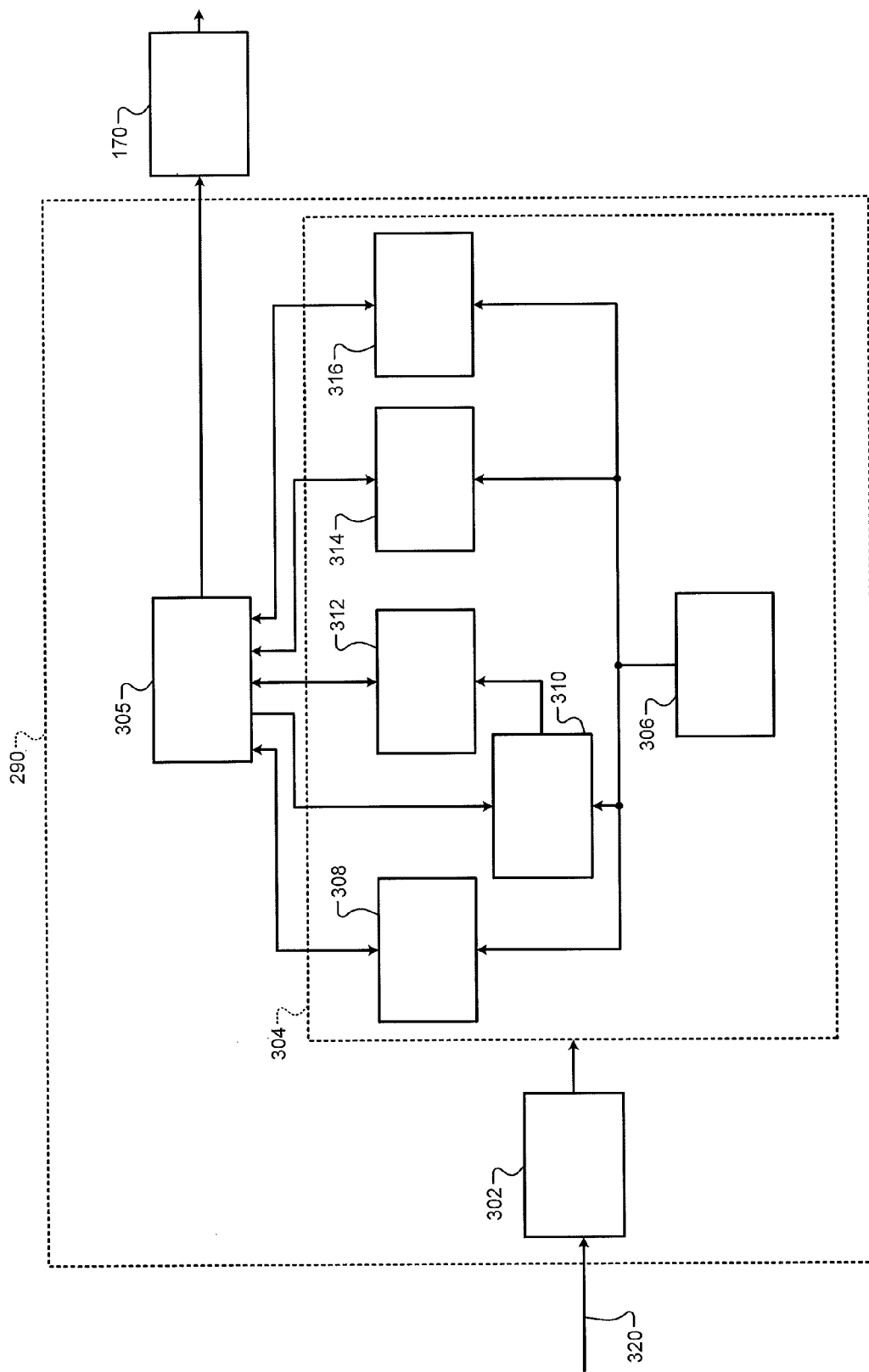
FIG. 3 is a functional block diagram of an example exhaust system module according to the present disclosure.

Referring now to FIG. 3, a functional block diagram of an example implementation of the exhaust system module 290 is presented. The exhaust system module 290 includes a configuration module 302, an exhaust system modeling module 304, and a storage module 305. The exhaust system modeling module 304 includes an exhaust gas flowrate (EGF) determination module 306, an input temperature module 308, a steady-state (SS) temperature module 310, a mass temperature module 312, an output temperature module 314, and a pressure determination module 316.

The exhaust system modeling module 304 is initially configured based on the exhaust system 200 of FIG. 2. In other words, the exhaust system modeling module 304 is initially configured based on a generic exhaust system that is applicable to a variety of models and types of engine systems and vehicles.

The configuration module 302 receives actual configuration data 320 indicative of an actual exhaust system configuration of the vehicle in which the exhaust system module 290 is implemented. If the actual exhaust system configuration differs from the configuration of the exhaust system 200, the configuration module 302 re-configures the exhaust system modeling module 304 based on the actual configuration data 320. Re-configuration may include, for example, enabling and disabling components of the generic configuration based on the actual configuration and/or re-configuring parameters of an enabled component based on the actual configuration.

The EGF determination module 306 determines an EGF for each component of the exhaust system. The EGF of a component corresponds to a mass flowrate of exhaust gas through the component. The EGF determination module 306 may determine the EGF for each of the exhaust system components based on one or more operating parameters. For example only, the EGF for a component may be determined based on the coolant temperature, ethanol concentration of the fuel injected, spark timing, equivalence ratio, vehicle speed, ambient air temperature, intake air temperature, and the accelerator position. The EGF for the component may also be determined based on the EGR flowrate, MAF, air-per-cylinder (APC), ambient air pressure, engine speed, flapper valve position(s), and/or the waste gate duty cycles. The EGF determination module 306 may determine the EGFs, for example, using functions or mappings that relate the operating parameter(s) to the EGFs, respectively.

The EGF determination module 306 may also determine the EGF(s) based on the mode of operation of the engine 102. For example only, the EGF(s) may be determined based on whether one or more of the cylinders 112 are deactivated, whether the engine 102 is idling, whether the engine 102 is running or shutdown (e.g., hybrid applications), and/or whether the fuel for each firing event is being injected in one or more pulses (e.g., two pulses).

If one or more cylinders are deactivated, the EGF(s) may be determined based on the number of deactivated and/or activated cylinders. The EGF(s) may be determined based on the period of time that the engine 102 has been shutdown (i.e., OFF) when the engine is shutdown. The EGF determination module 306 may also determine the EGF(s) based on various exhaust system modes, such as whether air is being injected into the exhaust system (e.g., by an auxiliary air pump), whether catalyst warmup is occurring, and/or whether light-off is occurring within one or more catalysts of the exhaust system.

The EGF determination module 306 may also determine the EGF(s) based on the actual configuration of the exhaust system and/or characteristics of the various components. For example only, the exhaust system may be configured as to bring together the exhaust gas from the right and left exhaust manifolds 202 and 204 at a confluence point (not shown). The EGF determination module 306 may sum the two EGFs of upstream components for the components downstream of the confluence point. Characteristics that may affect the EGF may include, for example, curvature and/or cross sectional area.

The input temperature module 308 estimates an input temperature for each of the components of the actual exhaust system. The input temperature of a component corresponds to the temperature of exhaust gas at an input of that component. The input temperature module 308 stores the input temperatures for the components, respectively, in the storage module 305. The input temperature module 308 may set the input temperature for a component equal to or based on the output temperature of the preceding (i.e., upstream) component of the exhaust system. For example only, the input temperature module 308 may set the input temperature for an N-th component of the exhaust system based on the output temperature of an (N−1)-th component.

For an exhaust manifold (e.g., the right and left exhaust manifolds 202 and 204) the input temperature module 308 may set the input temperatures equal to or based on an engine output temperature. The input temperature module 308 may determine the engine output temperature based on one or more operating parameters, such as the engine load, the APC, the engine speed, the spark timing, the equivalence ratio, the ethanol concentration of the fuel, the vehicle speed, and/or the warmup state of the engine 102. The input temperature module 308 may determine the engine output temperature using a function or mapping that relates the operating parameters to the engine output temperature.

When the exhaust system includes an EGR system (e.g., the EGR system 280), the input temperature module 308 determines an input temperature for the EGR system based on a temperature of the exhaust gas at the point where the EGR system connects to the exhaust system. The input temperature module 308 may also determine input temperature for each component of the EGR system, such as the EGR pipes, the EGR valve, and/or the EGR cooler.

The SS temperature module 310 estimates an SS temperature for each component of the actual exhaust system. The SS temperature for a component corresponds to a temperature that the component itself will reach if the engine load conditions remain constant (i.e., steady state). The SS temperature module 310 determines the SS temperature for the component based on the input temperature of the component, the ambient temperature, and a SS coefficient determined for the component.

The SS temperature module 310 determines the SS coefficient for the component based on the EGF for the component. For example only, the SS temperature module 310 may determine the SS temperature for the component using the equation:

$$T_{SS}=(T_{IN}-T_A)*C_{SS},$$

where $T_{SS}$ is the SS temperature of the component, $T_{IN}$ is the input temperature of the component, $T_A$ is the ambient air temperature, and $C_{SS}$ is the SS coefficient for the component.

The SS temperature module 310 determines the SS coefficient for a turbocharger (e.g., the turbochargers 210, 212, 254, and/or 256) based on the EGF for the turbochargers and the DC of power applied to the associated wastegate. For example only, the SS temperature module 310 may determine the SS coefficient for the turbocharger 212 based on the EGF for the turbocharger 212 and the DC of power applied to the wastegate 206.

As the turbocharger draws in ambient air, the SS temperature module 310 also adjusts the SS temperature for the turbocharger based on the intake air temperature. For example only, the SS temperature module 310 may determine the SS temperature for the turbocharger using the equation:

$$T_{SS-T}=IAT+C_{SS-T}*(T_{IN-T}-IAT),$$

where $T_{SS-T}$ is the SS temperature of the turbocharger, IAT is the intake air temperature, $C_{SS-T}$ is the SS coefficient for the turbocharger, and $T_{IN-T}$ is the input temperature for the turbocharger.

The mass temperature module 312 determines a mass temperature for each of the exhaust system components. The mass temperature module 312 stores the mass temperatures in the storage module 305. The mass temperature module 312 determines the mass temperature for a component based on the SS temperature of the component and a mass coefficient determined for the component. The mass temperature corresponds to the temperature of the material that makes up the component.

The mass temperature module 312 determines the mass coefficient for the component based on the EGF determined for the component. The mass coefficient corresponds to the rate at which the mass temperature is changing toward the SS temperature of the component. For example only, the mass coefficient may increase as the EGF decreases. The mass temperature module 312 determines the mass temperature for the component based on, for example, a product of the SS temperature and the mass coefficient.

The mass temperature module 312 determines the mass coefficient for a turbocharger (e.g., the turbochargers 210, 212, 254, and/or 256) based on the EGF for the turbochargers and the DC of power applied to the associated wastegate. For example only, the mass temperature module 312 may determine the mass coefficient for the turbocharger 212 based on the EGF for the turbocharger 212 and the DC of power applied to the wastegate 206.

The output temperature module 314 determines an output temperature for each of the exhaust system components. The output temperature of a component corresponds to the temperature of exhaust gas at an output of that component. The output temperature module 314 stores the output temperatures in the storage module 305.

The output temperature module 314 may determine the output temperature for a component based on the input temperature for the component, the mass temperature of the component, and an output coefficient for the component. The output temperature module 314 determines the output temperature for the component based in the input temperature of the component plus or minus the change in temperature attributable to heat transfer between the component and air passing the component. More specifically, the output temperature module 314 determines the output temperature by adjusting the input temperature toward the mass temperature based on the output coefficient.

The output temperature module 314 determines the output coefficient for the component based on the EGF of the component. For example only, the output temperature module 314 may determine the output temperature for the component using the equation:

$$T_{OUT} = T_{IN} + (T_{IN} - T_{MASS}) * C_{OUT},$$

where $T_{OUT}$ is the output temperature of the component, $T_{IN}$ is the input temperature of the component, $T_{MASS}$ is the mass temperature of the component, and $C_{OUT}$ is the output coefficient of the component.

Catalysts of the exhaust system, such as the catalysts 218, 222, 226, 260, 264, and 268 may also produce heat. Accordingly, the output temperature module 314 increases the output temperature of a catalyst of the exhaust system based on the heat generated by the catalyst. The SS temperature module 310 and the mass temperature module 312 may also increase the SS temperature and the mass temperature of the catalyst, respectively, based on the heat generated by the catalyst.

The amount of heat generated by the catalyst will be referred to as a heat generation term. The heat generation term for the catalyst may be determined based on the EGF of the catalyst, the equivalence ratio, and/or the ethanol concentration of the fuel. For example only, when the equivalence ratio is 1.0 (i.e., when a stoichiometric air/fuel mixture being combusted), the heat generation term may be negligible. The heat generation term for the catalyst may also be determined based on whether an air is being supplied into the whether air is being injected into the exhaust system (e.g., by an auxiliary air pump) and/or whether the fuel for each firing event is being injected in one or more pulses (e.g., two pulses).

The output temperature module 314 determines the output coefficient for a turbocharger (e.g., the turbochargers 210, 212, 254, and/or 256) based on the EGF for the turbochargers and the DC of power applied to the associated wastegate. The output temperature module 314 determines the output coefficient for the turbocharger 212 based on the EGF for the turbocharger 212 and the DC of power applied to the wastegate 206. For example only, the output temperature module 314 may determine the output temperature for the turbocharger using the equation:

$$T_{OUT-T} = T_{IN-T} + C_{OUT-T} * (T_{M-T} - T_{IN-T})$$

where $T_{OUT-T}$ is the output temperature of the turbocharger, $T_{IN-T}$ is the input temperature for the turbocharger, $C_{OUT-T}$ is the output coefficient for the turbocharger, and $T_{M-T}$ is the mass temperature for the turbocharger.

The pressure determination module 316 determines an input pressure, an output pressure, and a pressure drop for each of the exhaust system components. The input pressure of a component corresponds to the pressure at the input of that component. The output pressure of a component corresponds to the pressure at the output of that component. The pressure drop of a component corresponds to the pressure decrease present between the input pressure of the component and the output pressure of the component. The pressure determination module 316 stores the input pressures and the output pressures in the storage module 305. The pressure determination module 316 may also store the pressure drops in the storage module 305.

Figure 4:
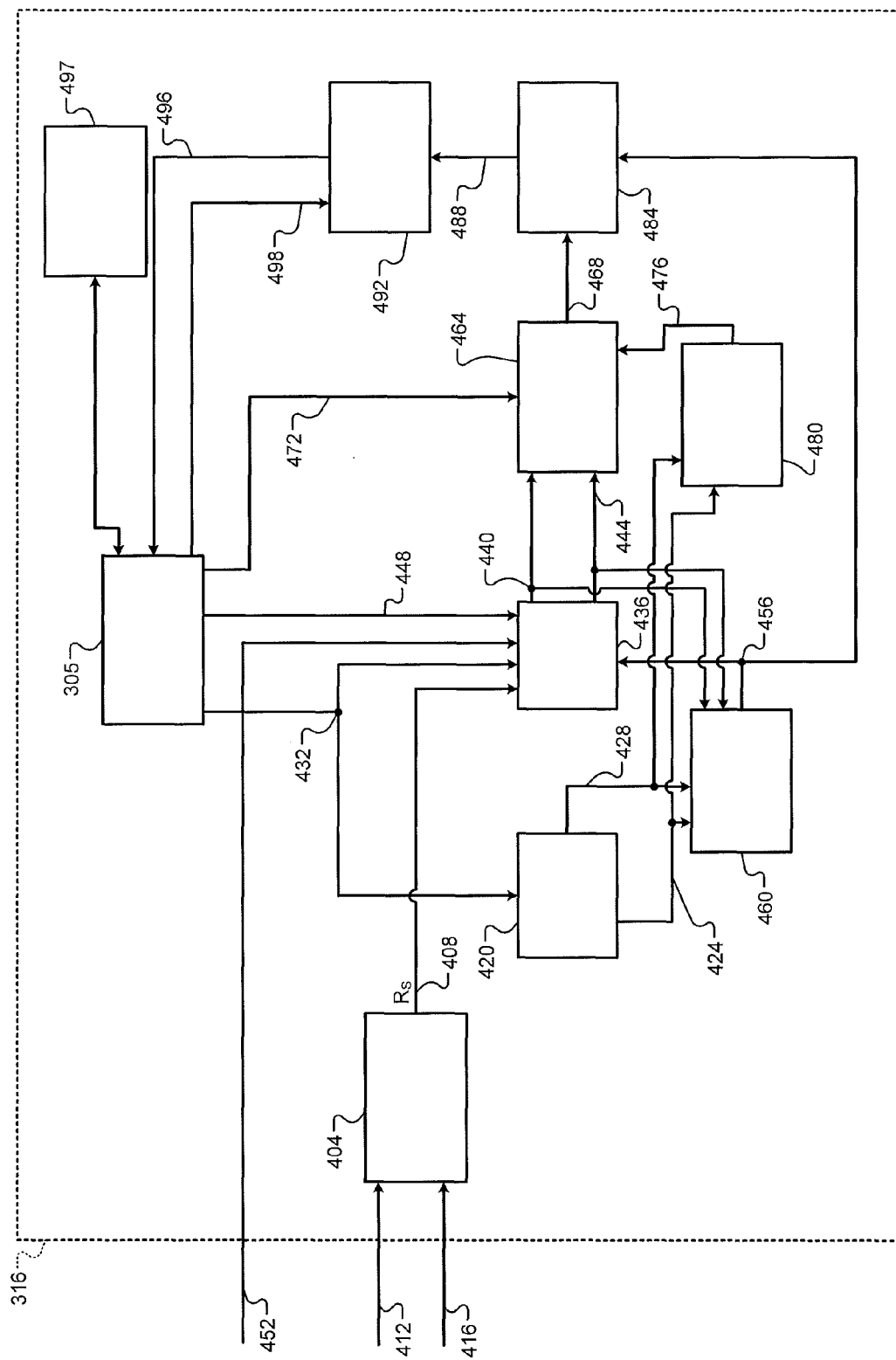
FIG. 4 is a functional block diagram of an example pressure determination module according to the present disclosure.

FIG. 4 includes a functional block diagram of an example implementation of the pressure determination module 316. The pressure determination module 316 begins with the last component in the actual exhaust system. The last component is the last component that exhaust flows through before exiting the exhaust system to the atmosphere. Dual output exhaust systems include two last components.

The pressure determination module 316 sets the output pressure for the last component equal to or based on ambient (barometric) air pressure. The pressure determination module 316 determines the pressure drop for the last component, as discussed further below. The pressure determination module 316 determines the input pressure for the last component based on the output pressure of the last component and the pressure drop of the last component.

For the next component upstream of the last component (moving toward an exhaust manifold), the pressure determination module 316 sets the output pressure for that component based on or equal to the input pressure of the last component. The pressure determination module 316 determines the pressure drop for the next component, and determines the input pressure for the next component based on the output pressure of the next component and the pressure drop of the next component. This process continues for each component working upstream until the exhaust manifold is reached. An example of how to determine the pressure drop for a component and the input pressure for a component will now be discussed.

Referring now to FIG. 4, a specific gas constant module 404 determines a specific gas constant 408 for the exhaust gas in the actual exhaust system. The specific gas constant 408 may be used for each component of the actual exhaust system as the amount of variation from component to component may be negligible.

The specific gas constant module 404 determines the specific gas constant 408 based on an equivalence ratio (EQR) 412 of the air/fuel mixture being combusted within the engine 102, a stoichiometric fuel to air ratio (FAR), and a humidity 416 of ambient air. The humidity 416 may be measured, for example, using a humidity sensor or determined based on one or more other parameters, such as the IAT. The specific gas constant module 404 may determine the specific gas constant 408, for example, using a function or a mapping (e.g., a lookup table) that relates EQRs, stoichiometric FARs, and ambient humidities to specific gas constants. An example function for determining the specific gas constant 408 for a gasoline and/or ethanol fueled engine is:

$$R_S = \frac{337.9 * Stoich * EQR + 1.744 * H - 17.5 * EQR + 286.8}{1 + Stoich * EQR},$$

where $R_S$ is the specific gas constant 408, Stoich is the stoichiometric FAR, EQR is the EQR 412 of the air/fuel mixture being combusted within the engine 102, and H is the ambient humidity 416. Other functions may be used for other types of fueling.

A viscosity module 420 determines a viscosity 424 of the exhaust gas within the component and a normalized viscosity 428 of the exhaust gas within the component. The viscosity 424 and the normalized viscosity 428 may be determined specifically for each different component of the actual exhaust system.

The viscosity module 420 determines the viscosity 424 for the component based on the input temperature 432 determined for the component (by the input temperature module 308). The viscosity module 420 may obtain the input temperature 432 from the storage module 305. In the case of a catalyst, due to the catalyst generating heat, a temperature of the catalyst (e.g., the mass temperature of the catalyst) may be used in place of the input temperature of the catalyst.

The viscosity module 420 may determine the viscosity 424 for the component, for example, using a function or a mapping that relates input temperatures of the component to viscosities. An example function for determining the viscosity 424 is:

$$\mu = \frac{(T_{IN} + 273)^{1.5}}{664010 * (T_{IN} + 461)},$$

where μ is the viscosity 424 (e.g., in kg/m*s), and $T_{IN}$ is the input temperature 432 of the component (e.g., in degrees Celsius). In the case of a mapping, the mapping is calibrated with entries for values of the viscosity 424 at various input temperatures.

As the function or mapping may be calibrated under different operating conditions, the viscosity module 420 determines the normalized viscosity 428 based on a normalization temperature where the function or mapping was calibrated. The viscosity module 420 may determine whether to use a first relationship or mapping or to use a second relationship or mapping based on whether the normalization temperature is greater than a predetermined temperature. For example, when the normalization temperature is greater than the predetermined temperature, the viscosity module 420 may determine the normalized viscosity 428 using the first relationship or mapping, which is the same as that used to determine the viscosity 424.

When the normalization temperature is less than the predetermined temperature, the viscosity module 420 may determine the normalized viscosity 428 using the second relationship or mapping. The predetermined temperature may be calibrated and may be, for example, approximately 40 degrees Celsius or another suitable temperature. An example of the second function for determining the normalized viscosity 428 is:

$$\mu_N = \frac{(T_{IN} + 273)^{1.5}}{661358 * (T_{IN} + 393)},$$

where $\mu_N$ is the normalized viscosity 428 (e.g., in kg/m*s) and $T_{IN}$ is the input temperature 432 of the component. In the case of a second mapping, the second mapping is calibrated with entries for values of the normalized viscosity 428 at various input temperatures while at the normalized temperature. The normalization temperature may be a predetermined value stored in memory. Along with the normalization temperature, predetermined values of an associated normalization specific gas constant ($R_N$) and an associated normalization exhaust density ($\rho_{U,N}$) are also stored for normalizing other parameters.

A density module 436 determines a density 440 of the exhaust gas within the component and a normalized density 444 of the exhaust gas within the component. The density 440 and the normalized density 444 may be determined specifically for each different component of the actual exhaust system.

The density module 436 determines the viscosity 424 for the component based on the input temperature 432 determined for the component (by the input temperature module 308) and a last input pressure 448 determined for the component. The temperatures and the pressures for each component may be determined at a predetermined rate, such as every 12.5 milliseconds or another suitable rate. The last input pressure 448 determined for the component therefore corresponds to the input pressure determined for the component the last time that the pressures and temperatures were determined. The density module 436 may obtain the input temperature 432 and the last input pressure 448 from the storage module 305. As stated above, in the case of a catalyst, due to the catalyst generating heat, the temperature of the catalyst (e.g., the mass temperature of the catalyst) may be used in place of the input temperature of the catalyst.

The density module 436 may determine the density 440 for the component, for example, using a function or a mapping that relates input temperatures and input pressures of the component to densities. An example function for determining the density 440 is:

$$\rho = \frac{1000 * P_{IN-L}}{R_S * (T_{IN} + 273.15)},$$

where ρ is the density 440 (e.g., in kg/m³), $T_{IN}$ is the input temperature 432 of the component (e.g., in degrees Celsius), and $p_{IN-L}$ is the last input pressure 448 of the component (e.g., in kPa). In the case of a mapping, the mapping is calibrated with entries for values of the density 440 at various input temperatures and last input pressures.

Because the function or mapping may be calibrated under different operating conditions, the density module 436 determines the normalized density 444 based on the normalization temperature, a normalized upstream pressure for the component, and the normalization specific gas constant ($R_N$). An example function for determining the normalized density 444 is:

$$\rho_N = \frac{1000 * P_{IN-N}}{R_{SN} * (T_N + 273.15)},$$

where $\rho_N$ is the normalized density 444 (e.g., in kg/m³), $T_N$ is the predetermined normalization temperature, and $p_{IN-N}$ is the normalized input pressure for the component (e.g., in kPa).

The density module 436 determines the normalized input pressure for the component ($p_{IN-N}$) based on a normalized ambient air pressure for the component, ambient air pressure 452, the last input pressure 448 of the component, and a pressure normalization value 456 for the component. The density module 436 may determine the normalized input pressure for the component, for example, using a function or mapping. An example function for determining the normalized input pressure is:

$$p_{IN-N} = p_{amb,n} + (p_{IN-L} - p_{AMB}) * f_P,$$

where $P_{IN-N}$ is the normalized input pressure for the component, $P_{amb,n}$ is the normalized ambient air pressure for the component, $P_{IN-L}$ is the last input pressure for the component, $P_{AMB}$ is the ambient air pressure 452, and $f_P$ is the pressure normalization value 456 for the component. The normalized ambient air pressure may be a predetermined value for the component that is stored in memory. A normalized ambient air pressure may be stored for each different component of the actual exhaust system. The ambient air pressure 452 may be measured using a sensor or determined based on one or more other parameters.

A first normalization value module 460 determines the pressure normalization value 456. When the engine 102 is started, the first normalization value module 460 may initialize the pressure normalization value 456 to a predetermined initialization value, such as 1.0. After initialization, the first normalization value module 460 determines the pressure normalization value 456 based on the last value of the viscosity 424, the last value of the normalized viscosity 428, the last value of the density 440, and the last value of the normalized density 444. The first normalization value module 460 may determine the pressure normalization value 456, for example, using a function or a mapping. An example of a function for determining the pressure normalization value 456 is:

$$f_P = \frac{\rho}{\rho_N}\left(\frac{\mu_N}{\mu}\right)^2,$$

where $f_P$ is the pressure normalization value 456, $\mu$ is the last value of the viscosity 424, $\mu_N$ is the last value of the normalized viscosity 428, $\rho$ is the last value of the density 440, and $\rho_N$ is the last value of the normalized density 444.

An EGF normalization module 464 determines a normalized EGF 468 for the component based on the EGF 472 determined for the component (by the EGF determination module 306) and a flow normalization value 476. The EGF normalization module 464 may obtain the EGF 472 from the storage module 305. The EGF normalization module 464 may determine the normalized EGF 468, for example, using a function or a mapping. An example of a function for determining the normalized EGF 468 is:

$EGF_N = EGF * f_M,$ where $EGF_N$ is the normalized EGF 468, EGF is the EGF 472 determined for the component, and $f_M$ is the flow normalization value 476.

A second normalization value module 480 determines the flow normalization value 476. When the engine 102 is started, the second normalization value module 480 may initialize the flow normalization value 476 to a predetermined initialization value, such as 1.0. After initialization, the second normalization value module 480 determines the flow normalization value 476 based on the last value of the viscosity 424 and the last value of the normalized viscosity 428. The second normalization value module 480 may determine the flow normalization value 476, for example, using a function or a mapping. An example of a function for determining the flow normalization value 476 is:

$$f_M = \frac{\mu_N}{\mu},$$

where $f_M$ is the flow normalization value 476, $\mu$ is the last value of the viscosity 424, and $\mu_N$ is the last value of the normalized viscosity 428.

A pressure drop module 484 determines a pressure drop 488 for the component based on a normalized pressure drop of the component and the pressure normalization value 456. The pressure drop module 484 may determine the pressure drop 488, for example, using a function or a mapping that relates normalized pressure drops and pressure normalization values to pressure drops. An example function for determining the pressure drop 488 is:

$$PDrop = \frac{PDrop_N}{f_P},$$

where PDrop is the pressure drop 488, $PDrop_N$ is the normalized pressure drop of the component, and $f_P$ is the pressure normalization value 456. The pressure drop module 484 determines the normalized pressure drop of the component based on the normalized EGF 468 of the component. For example, the pressure drop module 484 may determine the normalized pressure drop of the component using a function or a mapping that relates normalized EGFs to normalized pressure drops.

An input pressure module 492 determines the input pressure 496 for the component based on the pressure drop 488 of the component and the output pressure 498 determined for the component. An output pressure module 497 sets the output pressure 498 of a component equal to or based on the input pressure of a next component immediately downstream of that component. For the last component of the actual exhaust system, the output pressure module 497 sets the output pressure 498 equal to or based on the ambient air pressure 452. The output pressure module 497 obtains the input pressures from the storage module 305 and stores the output pressures of the components in the storage module 305.

The input pressure module 492 determines the input pressure 496 by adding the pressure drop 488 to the output pressure 498. The input pressure module 492 stores the input pressure 496 in the storage module 305 in association with the component. This process continues for each component in the actual exhaust system working upstream towards the exhaust manifold(s).

The actuator control module 170 selectively adjusts one or more engine operating parameters based on the parameters stored in the storage module 305. More specifically, the actuator control module 170 selectively adjusts one or more engine parameters based on the temperatures and/or pressures of one or more of the components of the actual exhaust system. For example only, the actuator control module 170 may adjust the amount of fuel injected, airflow into the engine 102, and/or the spark timing based on one or more of the pressures and temperatures stored in the storage module 305.

Figure 5:
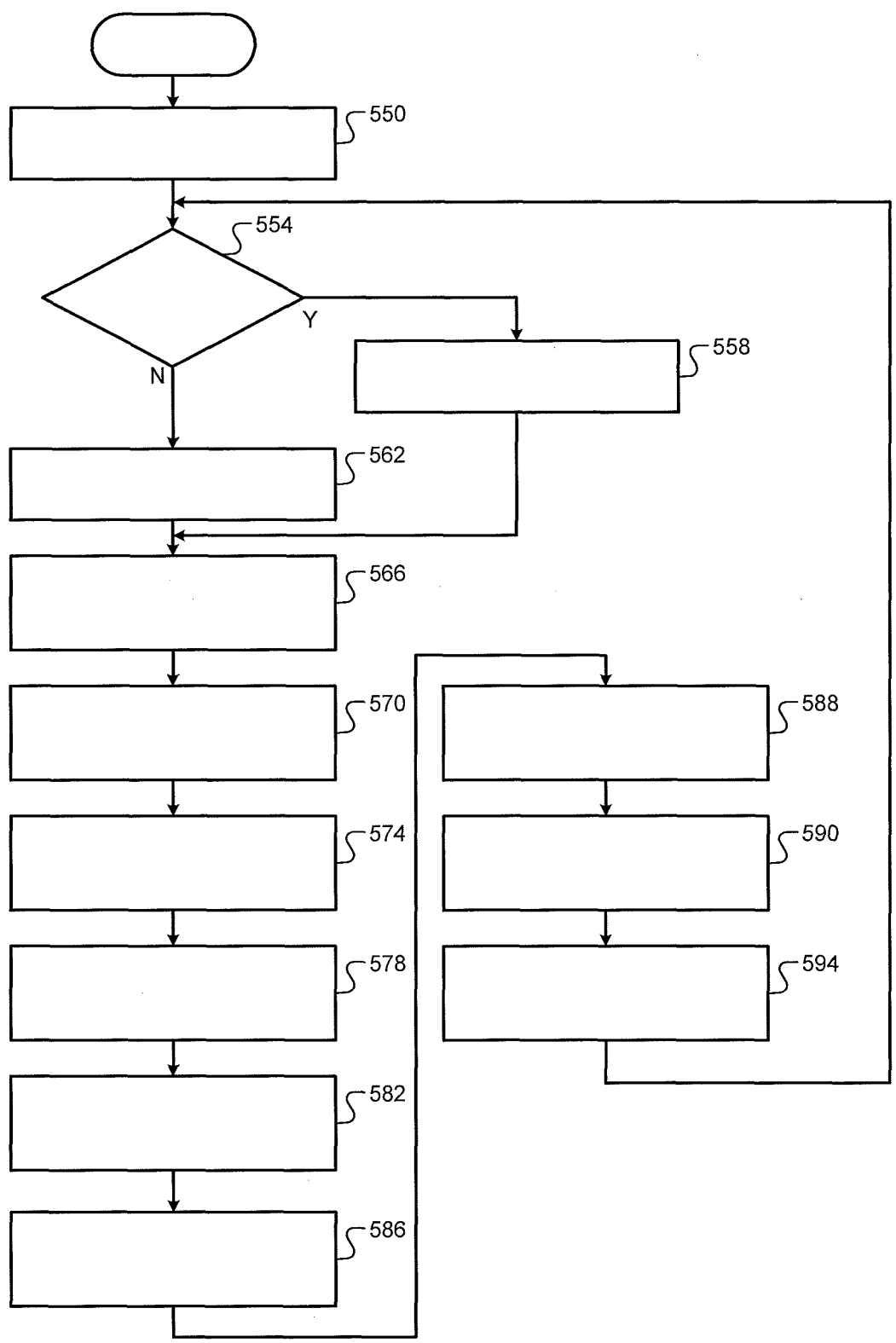
FIG. 5 is a flowchart depicting an example method of determining pressure at an input of a component of an exhaust system according to the present disclosure.

Referring now to FIG. 5, a flowchart depicting an example method of determining the input pressure for the components of the actual exhaust system is presented. Control begins with 550 where control initializes. For example only, the configuration module 302 may reset previously stored values and/or configure the exhaust system modeling module 304 at 550. The configuration module 302 configures the exhaust system modeling module 304 based on the actual exhaust system configuration of the vehicle.

The configuration module 302 may also reset a counter value (an N value) to a predetermined reset value (an M value) at 550. The predetermined reset value may be set to, for example only, the total number of components of the exhaust system. In this manner, control begins at the last component of the exhaust system, such as a muffler/tailpipe system.

The pressure determination module 316 determines whether the counter value is less than 1 at 554. If 554 is true, control the pressure determination module 316 resets the counter value to the predetermined reset value at 558. In this manner, the pressure determination module 316 resets the counter value to the total number of components of the actual exhaust system. If 554 is false, control continues with 562. The pressure determination module 316 decrements the counter value at 562, and control continues with 566. While resetting the counter value (N value) to the predetermined reset value (M value) and decrementing the counter value are provided as an example, resetting the counter value to zero, incrementing the counter value, and comparing the counter value with the total number of components in the actual exhaust system may be used.

At 566, the pressure determination module 316 sets the output pressure for the N-th component of the actual exhaust system to the input pressure for the N+1-th component of the actual exhaust system. In the case of the last component of the actual exhaust system (i.e., when N=M), the pressure determination module 316 sets the output pressure equal to or based on the ambient air pressure 452.

At 570, the viscosity module 420 determines the viscosity 424 of the exhaust gas input to the N-th component and determines the normalized viscosity 428 of the exhaust gas input to the N-th component. The specific gas constant module 404 determines the specific gas constant 408 at 574. As stated above, the specific gas constant 408 may be used for each component of the actual exhaust system. The specific gas constant 408 may therefore be determined at a different time, such as at 558.

The first normalization value module 460 determines the pressure normalization value 456 at 578. The second normalization value module 480 also determines the flow normalization value 476 at 578. At 582, the density module 436 determines the density 440 of the exhaust gas input to the N-th component and determines the normalized density 444 of the exhaust gas input to the N-th component. As discussed above, the density module 436 determines the density 440 and the normalized density 444 based on the temperature of exhaust gas input to the N-th component.

At 586, the EGF normalization module 464 obtains the EGF 472 for the N-th component from the storage module 305. The EGF normalization module 464 determines the normalized EGF 468 for the N-th component at 586. The pressure drop module 484 determines the normalized pressure drop for the N-th component of the actual exhaust system at 588. At 590, the pressure drop module 484 determines the pressure drop 488 for the N-th component of the actual exhaust system.

The input pressure module 492 determines the input pressure 496 for the N-th component of the actual exhaust system at 594 based on the output pressure of the N-th component and the pressure drop 488 across the N-th component. The input pressure module 492 stores the input pressure 496 in the storage module 305 in association with the N-th component. Control then returns to 554 to continue with for a next component upstream of the N-th component (i.e., the N−1-th component). Thus, the process is iterative in nature. The actuator control module 170 may control one or more operating parameters based on one or more of the parameters stored in the storage module 305.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A pressure determination system for a vehicle, comprising:
   an output pressure module that sets an output pressure of a first component of an exhaust system of the vehicle equal to one of:
      an input pressure of a second component that is immediately downstream of the first component in the exhaust system; and
      ambient air pressure;
   a pressure drop module that determines a pressure drop between an input of the first component and an output of the first component based a temperature of exhaust input to the first component;
   an input pressure module that determines an input pressure of the first component based on a sum of the output pressure of the first component and the pressure drop between the input and the output of the first component; and
   an actuator control module that selectively controls at least one engine actuator based on at least one of the input and output pressures of the first component.

2. The pressure determination system of claim 1 wherein:
   the output pressure module further sets an output pressure of a third component of the exhaust system that is immediately upstream of the first component in the exhaust system equal to the input pressure of the first component;
   the pressure drop module further determines a pressure drop between an input of the third component and an output of the third component based a temperature of exhaust input to the third component; and
   the input pressure module further determines an input pressure of the third component based on a sum of the output pressure of the third component and the pressure drop between the input and the output of the third component.

3. The pressure determination system of claim 1 further comprising:
   a viscosity module that determines a viscosity of the exhaust input to the first component based on the temperature of the exhaust input to the first component; and
   a density module that determines a density of the exhaust input to the first component based on the temperature of the exhaust input to the first component,
   wherein the pressure drop module determines the pressure drop between the input and the output of the first component based on the viscosity and the density of the exhaust input to the first component.

4. The pressure determination system of claim 3 further comprising:
   an exhaust gas flowrate (EGF) determination module that determines an EGF through the first component; and
   an EGF normalization module that determines a normalized EGF through the first component based on the EGF and the viscosity of the exhaust input to the first component,
   wherein the pressure drop module determines the pressure drop between the input and the output of the first component based on the normalized EGF.

5. The pressure determination system of claim 4 further comprising:
   a first normalization value module that determines a first normalization value for the first component based on the viscosity of the exhaust input to the first component and the density of the exhaust input to the first component,
   wherein the pressure drop module further determines a normalized pressure drop between the input and the output of the first component based on the normalized EGF through the first component and determines the pressure drop between the input and the output of the first component based on the normalized pressure drop and the first normalization value.

6. The pressure determination system of claim 5 wherein the pressure drop module determines the pressure drop between the input and the output of the first component based on the normalized pressure drop divided by the first normalization value.

7. The pressure determination system of claim 5 wherein the first normalization value module determines the first normalization value for the first component based on the viscosity of the exhaust input to the first component, a normalized viscosity of the exhaust input to the first component, the density of the exhaust input to the first component, and a normalized density of the exhaust input to the first component.

8. The pressure determination system of claim 5 wherein the density module determines the density of the exhaust input to the first component further based on a normalized input pressure for the first component and determines the normalized input pressure for the first component based on a normalized ambient air pressure, a previous value of the input pressure of the first component, an ambient air pressure, and the first normalization value.

9. The pressure determination system of claim 4 further comprising:
   a second normalization value module that determines a second normalization value for the first component based on the viscosity of the exhaust input to the first component,
   wherein the EGF normalization module determines the normalized EGF through the first component based on the EGF through the first component and the second normalization value.

10. The pressure determination system of claim 9 wherein the second normalization value module determines the second normalization value for the first component based on the viscosity of the exhaust input to the first component and a normalized viscosity of the exhaust input to the first component.

11. A method for a vehicle, comprising:
    setting an output pressure of a first component of an exhaust system of the vehicle equal to one of:

an input pressure of a second component that is immediately downstream of the first component in the exhaust system; and ambient air pressure;

determining a pressure drop between an input of the first component and an output of the first component based a temperature of exhaust input to the first component;

determining an input pressure of the first component based on a sum of the output pressure of the first component and the pressure drop between the input and the output of the first component; and selectively controlling at least one engine actuator based on at least one of the input and output pressures of the first component.

12. The method of claim 11 further comprising:

setting an output pressure of a third component of the exhaust system that is immediately upstream of the first component in the exhaust system equal to the input pressure of the first component;

determining a pressure drop between an input of the third component and an output of the third component based a temperature of exhaust input to the third component; and determining an input pressure of the third component based on a sum of the output pressure of the third component and the pressure drop between the input and the output of the third component.

13. The method of claim 11 further comprising:

determining a viscosity of the exhaust input to the first component based on the temperature of the exhaust input to the first component;

determining a density of the exhaust input to the first component based on the temperature of the exhaust input to the first component; and determining the pressure drop between the input and the output of the first component based on the viscosity and the density of the exhaust input to the first component.

14. The method of claim 13 further comprising:

determining an exhaust gas flowrate (EGF) through the first component;

determining a normalized EGF through the first component based on the EGF and the viscosity of the exhaust input to the first component; and determining the pressure drop between the input and the output of the first component based on the normalized EGF.

15. The method of claim 14 further comprising:

determining a first normalization value for the first component based on the viscosity of the exhaust input to the first component and the density of the exhaust input to the first component;

determining a normalized pressure drop between the input and the output of the first component based on the normalized EGF through the first component; and determining the pressure drop between the input and the output of the first component based on the normalized pressure drop and the first normalization value.

16. The method of claim 15 further comprising determining the pressure drop between the input and the output of the first component based on the normalized pressure drop divided by the first normalization value.

17. The method of claim 15 further comprising determining the first normalization value for the first component based on the viscosity of the exhaust input to the first component, a normalized viscosity of the exhaust input to the first component, the density of the exhaust input to the first component, and a normalized density of the exhaust input to the first component.

18. The method of claim 15 further comprising:

determining the density of the exhaust input to the first component further based on a normalized input pressure for the first component; and determining the normalized input pressure for the first component based on a normalized ambient air pressure, a previous value of the input pressure of the first component, an ambient air pressure, and the first normalization value.

19. The method of claim 14 further comprising:

determining a second normalization value for the first component based on the viscosity of the exhaust input to the first component; and determining the normalized EGF through the first component based on the EGF through the first component and the second normalization value.

20. The method of claim 19 further comprising determining the second normalization value for the first component based on the viscosity of the exhaust input to the first component and a normalized viscosity of the exhaust input to the first component.

* * * * *